(12) United States Patent
Wang et al.

(10) Patent No.: US 11,417,936 B2
(45) Date of Patent: Aug. 16, 2022

(54) OUTPUT ELECTRODE ASSEMBLY AND BATTERY MODULE

(71) Applicant: CONTEMPORARY AMPEREX TECHNOLOGY CO., LIMITED, Ningde (CN)

(72) Inventors: Chong Wang, Ningde (CN); Hua Cao, Ningde (CN); Mu Qian, Ningde (CN); Xianchun Zhu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/139,779

(22) Filed: Dec. 31, 2020

(65) Prior Publication Data

US 2021/0126323 A1 Apr. 29, 2021

Related U.S. Application Data (63) Continuation of application No. PCT/CN2019/124358, filed on Dec. 10, 2019.

(30) Foreign Application Priority Data

Dec. 23, 2018 (CN) .......................... 201822168790.0

(51) Int. Cl.
*H01M 50/531* (2021.01)
*H01M 50/174* (2021.01)
(Continued)

(52) U.S. Cl.
CPC ....... *H01M 50/531* (2021.01); *H01M 50/174* (2021.01); *H01M 50/207* (2021.01); *H01M 50/519* (2021.01)

(58) Field of Classification Search
None
See application file for complete search history.

(56) References Cited

U.S. PATENT DOCUMENTS

| 2010/0248029 A1* | 9/2010 | Butt | H01M 50/20 429/211 |
| 2011/0076521 A1* | 3/2011 | Shimizu | H01M 10/425 429/7 |
| 2019/0097202 A1* | 3/2019 | Morone | H01M 50/20 |

FOREIGN PATENT DOCUMENTS

| CN | 108254595 A | 7/2018 |
| CN | 207743290 U | 8/2018 |

(Continued)

OTHER PUBLICATIONS

International Search Report and Written Opinion, PCT/CN2019/124358, dated Mar. 9, 2020, 12 pgs.

(Continued)

*Primary Examiner* — Ula C Ruddock
*Assistant Examiner* — Amanda Rosenbaum
(74) *Attorney, Agent, or Firm* — Morgan, Lewis & Bockius LLP (57) ABSTRACT

This application provides an output electrode assembly including a circuit board, a connector, an output electrode connecting sheet and a fastening base. The connector is disposed at one end of the circuit board in a longitudinal direction of the output electrode assembly, and the output electrode connecting sheet is spaced apart from the connector in a transverse direction of the output electrode assembly. The fastening base has a partition wall; a first mounting portion formed on one side of the partition wall in the transverse direction, where the connector is fixedly mounted to the first mounting portion; and a second mounting portion formed on the other side of the partition wall in the transverse direction, where the output electrode connecting sheet (Continued)

is fixedly mounted to the second mounting portion. The fastening base has functions of both an output electrode base and a connector mounting base in a battery module.

14 Claims, 5 Drawing Sheets

(51) Int. Cl.
    *H01M 50/207*     (2021.01)
    *H01M 50/519*     (2021.01)
    *H01M 50/244*     (2021.01)
    *H01M 50/204*     (2021.01)
    *H01M 50/287*     (2021.01)
    *H01M 50/209*     (2021.01)
    *H01M 50/284*     (2021.01)
    *H01M 50/50*     (2021.01)

(56) References Cited

FOREIGN PATENT DOCUMENTS

| | | |
|---|---|---|
| CN | 207818730 U | 9/2018 |
| CN | 207896173 U | 9/2018 |
| CN | 208256764 U | 12/2018 |
| CN | 209104222 U | 7/2019 |
| JP | 2013105522 A | 5/2013 |

OTHER PUBLICATIONS

Contemporary Amperex Technology Co., Limited, Written Opinion of the International Searching Authority, PCT/CN2019/124358, dated Mar. 9, 2020, 5 pgs.

* cited by examiner

OUTPUT ELECTRODE ASSEMBLY AND BATTERY MODULE

CROSS REFERENCE TO RELATED APPLICATIONS

This application is a continuation application of PCT Application No. PCT/CN2019/124358, filed on Dec. 10, 2019, which claims priority to Chinese Patent Application No. 201822168790.0, filed with the State Intellectual Property Office of the People's Republic of China on Dec. 23, 2018, all of which are incorporated herein by reference in their entirety.

TECHNICAL FIELD

This application relates to the field of battery technologies, and in particular, to an output electrode assembly and a battery module.

BACKGROUND

Battery modules usually include a plurality of batteries arranged side by side, a plurality of connection bars connecting the plurality of batteries in series and parallel, an FPC for collecting battery temperature and voltage, a connector (a low-voltage interface of the battery module) that electrically connects the FPC to a control system and an output electrode connecting sheet (a high-voltage interface of the battery module) that electrically connects the plurality of batteries to an external apparatus. At present, in order to fix the connector and the output electrode connecting sheet, a traditional battery module is typically provided with two independent sets of components (namely, an output electrode base and a connector mounting base) to mount the output electrode connecting sheet and the connector respectively. The two sets of components need to be separately processed and formed, and then assembled with the output electrode connecting sheet and the connector respectively, which leads to low assembly efficiency of the battery module and is not conducive to the integration of the battery module.

SUMMARY

In view of the problem in the background, an objective of this application is to provide an output electrode assembly and a battery module. The output electrode assembly has few components and a high degree of integration, which improves the assembly efficiency and integration of the battery module.

To achieve the foregoing objective, this application provides an output electrode assembly and a battery module, where the output electrode assembly includes a circuit board, a connector, an output electrode connecting sheet and a fastening base. The connector is disposed at one end of the circuit board in a longitudinal direction of the output electrode assembly, and the output electrode connecting sheet is spaced apart from the connector in a transverse direction of the output electrode assembly that is perpendicular to the longitudinal direction. The fastening base has a partition wall located between the output electrode connecting sheet and the connector; a first mounting portion formed on one side of the partition wall in the transverse direction, where the connector is fixedly mounted to the first mounting portion; and a second mounting portion formed on the other side of the partition wall in the transverse direction, where the output electrode connecting sheet is fixedly mounted to the second mounting portion.

The first mounting portion has a first bottom wall connected to the partition wall and extending in the transverse direction; a first front wall connected to the partition wall and the first bottom wall; and a first rear wall spaced apart from the first front wall in the longitudinal direction and connected to the partition wall and the first bottom wall. The connector is accommodated in a housing cavity formed by the first bottom wall, the first front wall, the first rear wall and the partition wall.

The first mounting portion further has an opening formed in the first front wall and/or the first rear wall; and an elastic clasp cantilevered in the opening and griping the connector together with the first rear wall and/or the first front wall.

The fastening base further has a transitional connection wall connected to the partition wall and the first rear wall; and a supporting portion connected to the transitional connection wall and extending in the longitudinal direction, where the circuit board is supported by the supporting portion.

The circuit board is provided with position locking holes. The fastening base further has position locking posts disposed on the supporting portion, where the position locking posts are fitted with the position locking holes to fasten the circuit board.

The one end of the circuit board has a first bending portion; a transition portion; and a second bending portion, which forms a U-shaped structure together with the transition portion and the first bending portion. The output electrode assembly further includes a reinforcing plate disposed between the second bending portion and the first bending portion. The connector is located on one side of the second bending portion in the longitudinal direction.

The second mounting portion has a second bottom wall connected to the partition wall and extending in the transverse direction; a side wall connected to the second bottom wall and spaced apart from the partition wall in the transverse direction; and a second rear wall connected to the second bottom wall and spaced apart from the partition wall in the transverse direction. The output electrode connecting sheet is partly located between the second rear wall and the partition wall, and partly accommodated in the housing cavity formed by the second bottom wall, the side wall, the second rear wall and the partition wall.

The output electrode assembly further includes an insert embedded in the second bottom wall, where the output electrode connecting sheet is fixed to the insert.

The second mounting part further has a second front wall connected to the partition wall and the second bottom wall.

This application further provides a battery module, including a plurality of batteries and the foregoing output electrode assembly, where the output electrode assembly is disposed above the plurality of batteries.

Beneficial effects of this application are as follows:

As the fastening base is provided with the first mounting portion and the second mounting portion to respectively mount the connector and the output electrode connecting sheet (that is, the connector and the output electrode connecting sheet are both fixed onto the same fastening base), the fastening base has functions of both an output electrode base and a connector mounting base in a traditional battery module. Therefore, the output electrode assembly has a small quantity of components and high degree of integration, improving the assembly efficiency and integration of the battery module.

1. output electrode assembly
11. circuit board
111. first bending portion
112. transition portion
113. second bending portion
114. position locking hole
12. connector
13. output electrode connecting
14. fastening base
141. partition wall
142. first mounting portion
1421. first bottom wall
1422. first front wall
1423. first rear wall
1424. opening
1425. elastic clasp
143. second mounting portion
1431. second bottom wall
1432. side wall
1433. second rear wall
1434. second front wall
144. transitional connection wall
145. support portion
146. position locking post sheet
15. reinforcing plate
16. insert
2. battery
3. electrical connection sheet
4. end plate
X. transverse direction
Y. longitudinal direction
Z. up-down direction

DESCRIPTION OF EMBODIMENTS

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, unless otherwise specified and defined explicitly, the terms "first" and "second" are merely intended for a purpose of description, and should not be understood as any indication or implication of relative importance; the term "plurality of" indicates two or more (including two); and unless otherwise specified and defined explicitly, the terms "connection" and "fixing" should be understood in their general senses. For example, a "connection" may be a fixed connection, a detachable connection, or an integrated connection, and may be an electrical connection or signal a connection; and a "connection" may be a direct connection, or an indirect connection through an intermediate medium. A person of ordinary skill in the art can understand specific meanings of these terms in this application based on specific situations.

In the descriptions of the specification, it should be understood that the positional terms such as "above", "under (or bottom)", "front", and "rear" described in the embodiments of this application are described as seen from the angles shown in the accompanying drawings, and should not be understood as limitations on the embodiments of this application. In addition, in the context, it should also be understood that when an element is referred to as being "above" or "under" another element, the element can either be directly connected "above" or "under" the another element, or be indirectly connected "above" or "under" the another element through an intermediate element. This application is hereinafter further described in detail with reference to specific embodiments and the accompanying drawings.

Figure 1:
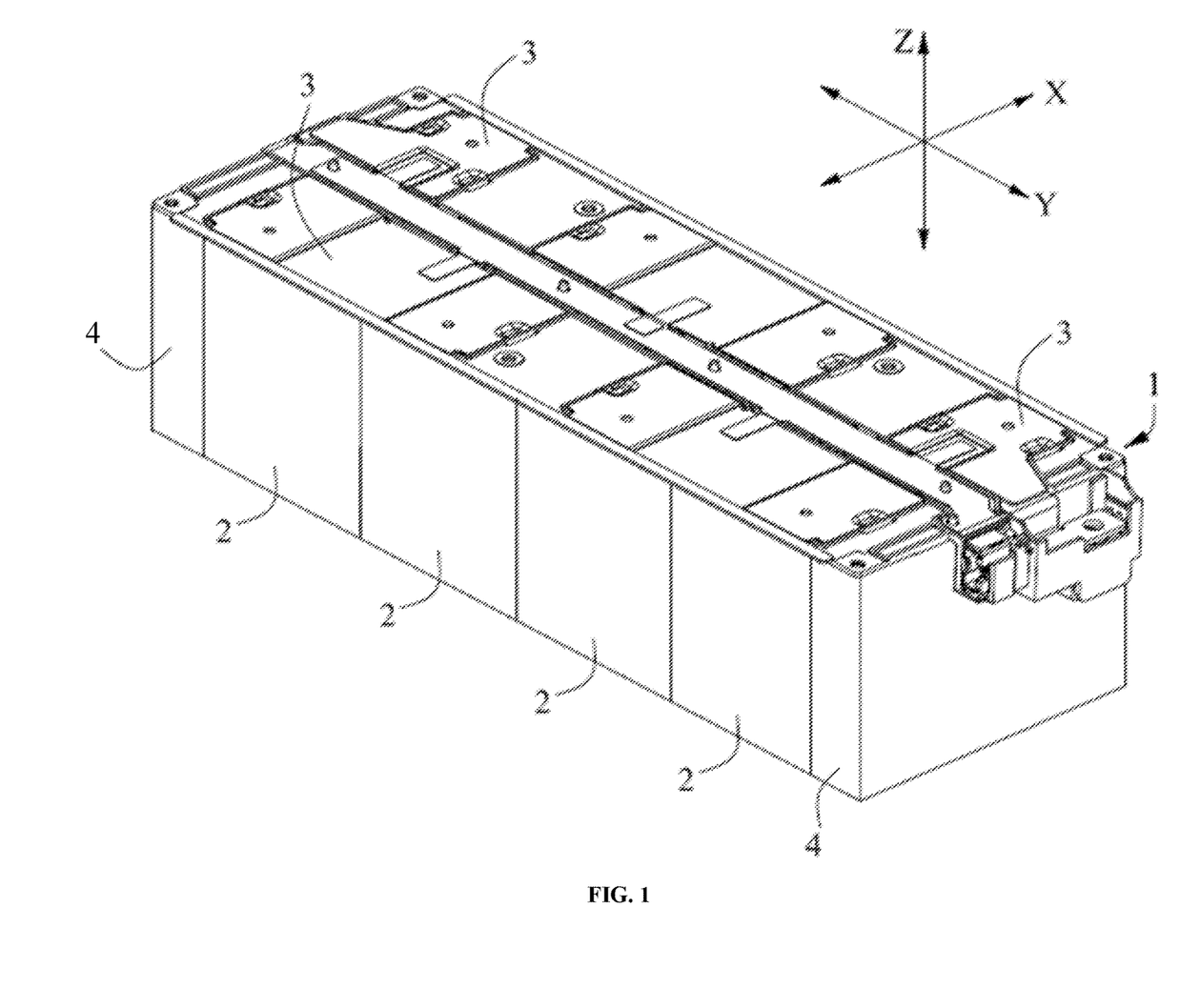
FIG. 1 is a perspective view of a battery module in this application.

Referring to FIG. 1, a battery module of this application includes an output electrode assembly 1, a plurality of batteries 2, a plurality of electrical connection sheets 3, two end plates 4, and a control system (not shown).

Figure 2:
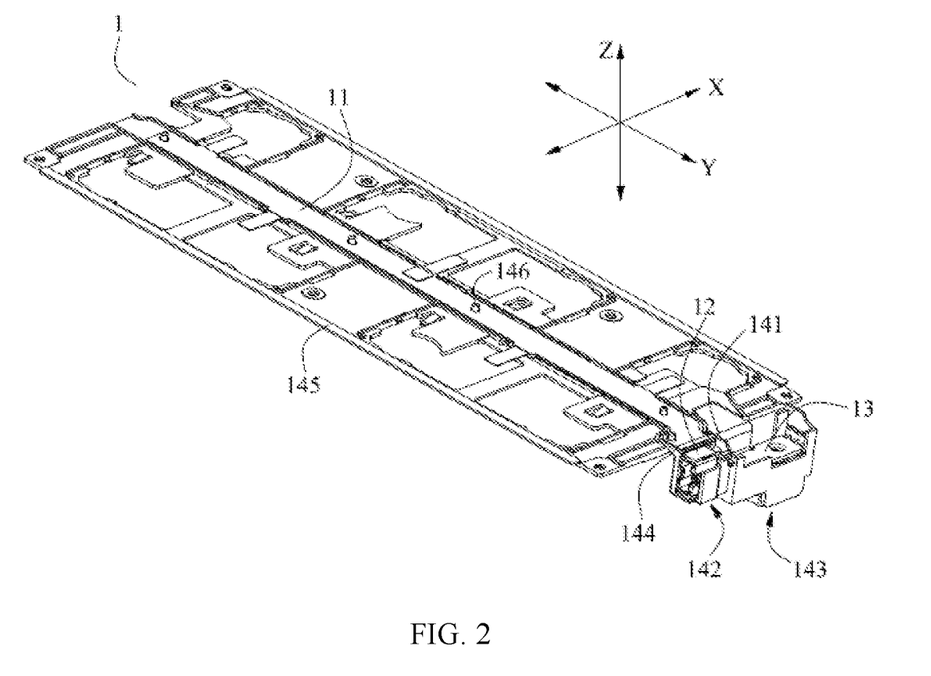
FIG. 2 is a perspective view of an output electrode assembly of a battery module.
Figure 3:
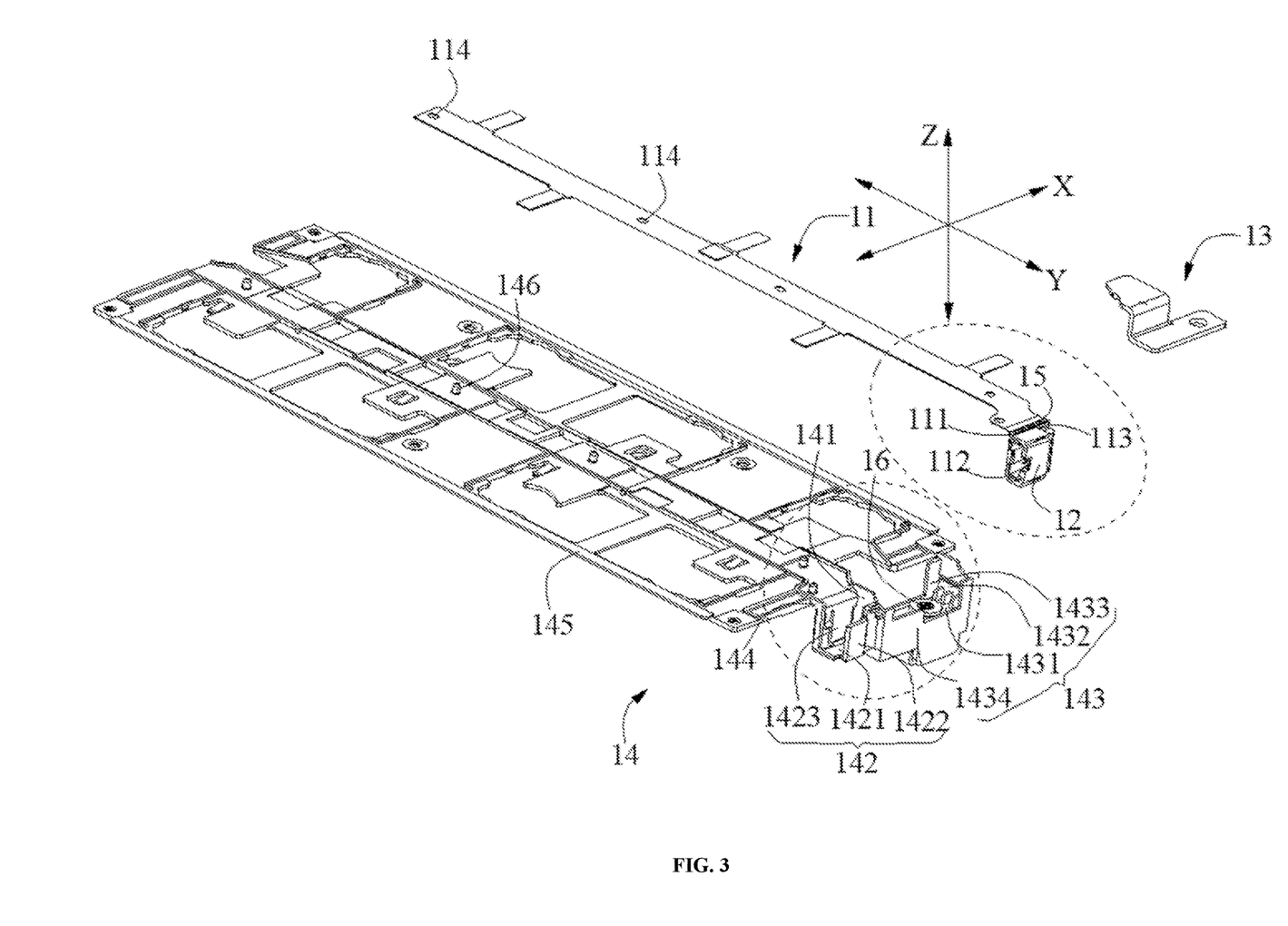
FIG. 3 is an exploded view of FIG. 2.
Figure 4:
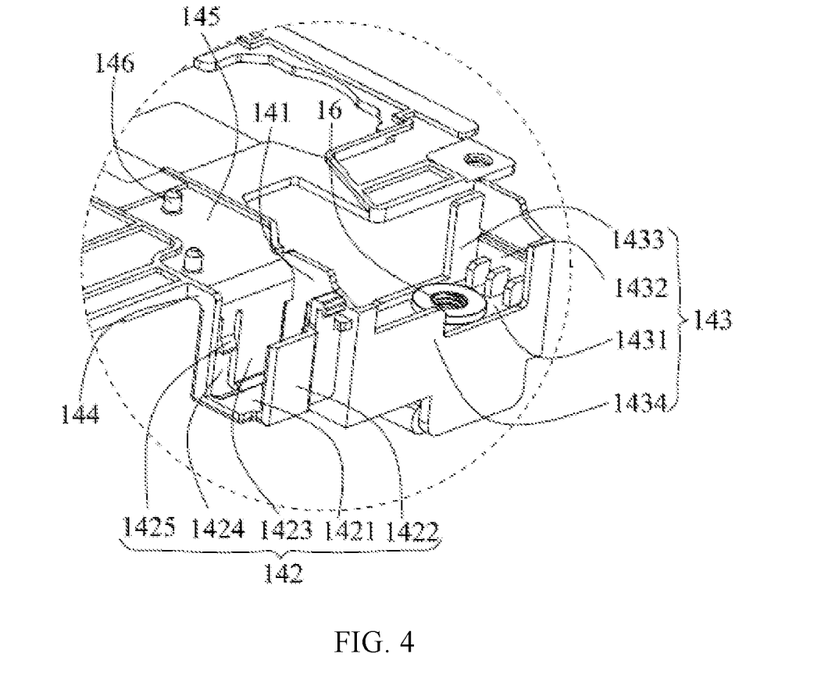
FIG. 4 is an enlarged view of a circled part in FIG. 3.
Reference signs are described as follows.

Referring to FIG. 2 to FIG. 4, the output electrode assembly 1 is disposed above the plurality of batteries 2 and includes a circuit board 11, a connector 12, an output electrode connecting sheet 13, a fastening base 14, a reinforcing plate 15 and an insert 16.

The circuit board 11 is provided with a circuit for collecting temperature and voltage of the battery 2. The circuit board 11 may be a flexible printed circuit board (Flexible Printed Circuit, FPC for short).

The connector 12 is electrically connected to the circuit in the circuit board 11 and the control system, to implement information interaction between the circuit board 11 and the control system. Referring to FIG. 2, the connector 12 is disposed at one end of the circuit board 11 in a longitudinal direction Y and spaced apart from the output electrode connecting sheet 13 in a transverse direction X, where the connector 12 and the output electrode connecting sheet 13 are both fixed onto the fastening base 14.

Referring to FIG. 3 and FIG. 4, the fastening base 14 has a partition wall 141 located between the output electrode connecting sheet 13 and the connector 12; a first mounting portion 142 formed on one side of the partition wall 141 in the transverse direction X, where the connector 12 is fixedly mounted to the first mounting portion 142; and a second mounting portion 143 formed on the other side of the partition wall 141 in the transverse direction X, where the output electrode connecting sheet 13 is fixedly mounted to the second mounting portion 143.

As the fastening base 14 is provided with the first mounting portion 142 and the second mounting portion 143 to respectively mount the connector 12 and the output electrode connecting sheet 13 (that is, the connector 12 and the output electrode connecting sheet 13 are both fixed onto the same fastening base), the fastening base 14 has functions of both an output electrode base and a connector mounting base in a traditional battery module. Therefore, the output electrode assembly 1 has a small quantity of components and high degree of integration, improving the assembly efficiency and integration of the battery module.

Referring to FIG. 3 and FIG. 4, the first mounting portion 142 has a first bottom wall 1421 connected to the partition wall 141 and extending in the transverse direction X; a first front wall 1422 connected to the partition wall 141 and the first bottom wall 1421; and a first rear wall 1423 spaced apart from the first front wall 1422 in the longitudinal direction Y and connected to the partition wall 141 and the first bottom wall 1421. The connector 12 is accommodated in a housing cavity formed by the first bottom wall 1421, the first front wall 1422, the first rear wall 1423 and the partition wall 141.

Referring to FIG. 3 and FIG. 4, the first mounting portion 142 further has an opening 1424 formed in the first front wall 1422 and/or the first rear wall 1423; and an elastic clasp 1425 cantilevered in the opening 1424. When the connector 12 is disposed in the housing cavity formed by the first bottom wall 1421, the first front wall 1422, the first rear wall 1423 and the partition wall 141, the elastic clasp 1425 can grip the connector 12 together with the first rear wall 1423 and/or the first front wall 1422, thereby avoiding the problem of poor contact caused by shaking of the connector 12 during use of the battery module.

Referring to FIG. 2 to FIG. 4, the fastening base 14 further has a transitional connection wall 144 connected to the partition wall 141 and the first rear wall 1423; and a supporting portion 145 connected to the transitional connecting wall 144 and extending in the longitudinal direction Y, where the circuit board 11 is supported by the supporting portion 145. The support portion 145 of the fastening base 14 can be used to support the circuit board 11. Therefore, the battery module does not need an additional structure for fixing the circuit board 11, thereby reducing the components of the battery module and further improving the assembly efficiency and integration of the battery module.

Referring to FIG. 2 and FIG. 3, the circuit board 11 is provided with position locking holes 114. The fastening base 14 further has position locking posts 146 disposed on the supporting portion 145, where the position locking posts 146 are fitted with the position locking holes 114 to fasten the circuit board 11. During an assembly process of the output electrode assembly 1, based on the positioning and cooperation of the position locking holes 114 and the position locking posts 146, the assembly can be completed quickly, thereby improving the assembly efficiency of the battery module.

Referring to FIG. 3, the one end of the circuit board 11 has a first bending portion 111; a transition portion 112; and a second bending portion 113, which forms a U-shaped structure together with the transition portion 112 and the first bending portion 111. The reinforcing plate 15 is disposed between the second bending portion 113 and the first bending portion 111, and the connector 12 is located at one side of the second bending portion 113 in the longitudinal direction Y and is connected to the second bending portion 113. Herein, disposition of the reinforcing plate 15 enhances the strength of the second bending portion 113 and facilitates connection between the connector 12 and the second bending portion 113.

Referring to FIG. 3 and FIG. 4, the second mounting portion 143 has a second bottom wall 1431 connected to the partition wall 141 and extending in the transverse direction X; a side wall 1432 connected to the second bottom wall 1431 and spaced apart from the partition wall 141 in the transverse direction X; and a second rear wall 1433 connected to the second bottom wall 1431 and spaced apart from the partition wall 141 in the transverse direction X. The output electrode connecting sheet 13 is partly located between the second rear wall 1433 and the partition wall 141, and partly accommodated in the housing cavity formed by the second bottom wall 1431, the side wall 1432, the second rear wall 1433 and the partition wall 141. The insert 16 is embedded in the second bottom wall 1431 of the second mounting portion 143, and the output electrode connecting sheet 13 is fixed to the insert 16 by a fastener.

Referring to FIG. 3 and FIG. 4, the second mounting portion 143 further has a second front wall 1434 connected to the partition wall 141 and the second bottom wall 1431. The second front wall 1434 and the second rear wall 433 together define a mounting position of the output electrode connecting sheet 13.

Referring to FIG. 1, the plurality of electrical connection sheets 3 are fixedly disposed on the support portion 145 of the fastening base 14 of the output pole assembly 1, where each electrical connection sheet 3 is electrically connected to a corresponding battery 2, so as to realize the electrical connection between all the batteries 2.

Referring to FIG. 1, the two end plates 4 are respectively disposed at two ends of the plurality of batteries 2 in the longitudinal direction Y to firmly grip the plurality of batteries 2.

What is claimed is:

1. An output electrode assembly used for a battery module, comprising:
   a circuit board;
   a connector, disposed at a first end of the circuit board in a longitudinal direction of the output electrode assembly, wherein the connector is electrically connected to the circuit board and serves as a first voltage interface of the battery module, and the first end of the circuit board has a first bending portion, a transition portion, and a second bending portion, which forms a U-shaped structure together with the transition portion and the first bending portion, and the connector is located on one side of the second bending portion in the longitudinal direction;
   a reinforcing plate disposed between the second bending portion and the first bending portion;
   an output electrode connecting sheet, spaced apart from the connector in a transverse direction of the output electrode assembly that is perpendicular to the longitudinal direction, wherein the output electrode connecting sheet serves as a second voltage interface of the battery module; and
   a fastening base, having a supporting portion supporting the circuit board, a partition wall located between the output electrode connecting sheet and the connector, the partition wall extending in the longitudinal direction of the output electrode assembly and having a thickness direction in the transverse direction of the output electrode assembly that is perpendicular to the longitudinal direction, and a transitional connection wall connecting the partition wall to the supporting portion;
   the fastening base further including a first mounting portion formed on and including one side of the partition wall in the thickness direction of the partition wall, wherein the connector is fixedly mounted to the first mounting portion; and
   the fastening base further including a second mounting portion formed on and including the other side of the partition wall in the thickness direction of the partition wall, wherein the output electrode connecting sheet is fixedly mounted to the second mounting portion.

2. The output electrode assembly according to claim 1, wherein
   the first mounting portion has a first bottom wall connected to the partition wall and extending in the transverse direction; a first front wall connected to the partition wall and the first bottom wall; and a first rear wall spaced apart from the first front wall in the longitudinal direction and connected to the partition wall and the first bottom wall; and
   the connector is accommodated in a housing cavity formed by the first bottom wall, the first front wall, the first rear wall and the partition wall.

3. The output electrode assembly according to claim 2, wherein the first mounting portion further has an opening formed in the first front wall and/or the first rear wall; and an elastic clasp cantilevered in the opening and griping the connector together with the first rear wall and/or the first front wall.

4. The output electrode assembly according to claim 1, wherein
the circuit board is provided with position locking holes; and
the fastening base further has position locking posts disposed on the supporting portion, wherein the position locking posts are fitted with the position locking holes to fasten the circuit board.

5. The output electrode assembly according to claim 1, wherein
the second mounting portion has a second bottom wall connected to the partition wall and extending in the transverse direction; a side wall connected to the second bottom wall and spaced apart from the partition wall in the transverse direction; and a second rear wall connected to the second bottom wall and spaced apart from the partition wall in the transverse direction; and
the output electrode connecting sheet is partly located between the second rear wall and the partition wall, and partly accommodated in the housing cavity formed by the second bottom wall, the side wall, the second rear wall and the partition wall.

6. The output electrode assembly according to claim 5, wherein the output electrode assembly further comprises an insert embedded in the second bottom wall, wherein the output electrode connecting sheet is fixed to the insert.

7. The output electrode assembly according to claim 5, wherein the second mounting portion further has a second front wall connected to the partition wall and the second bottom wall.

8. A battery module, comprising a plurality of batteries and an output electrode assembly, wherein the output electrode assembly is disposed above the plurality of batteries, the output electrode assembly comprising:
a circuit board;
a connector, disposed at a first end of the circuit board in a longitudinal direction of the output electrode assembly, wherein the connector is electrically connected to the circuit board and serves as a first voltage interface of the battery module, and the first end of the circuit board has a first bending portion, a transition portion, and a second bending portion, which forms a U-shaped structure together with the transition portion and the first bending portion, and the connector is located on one side of the second bending portion in the longitudinal direction;
a reinforcing plate disposed between the second bending portion and the first bending portion;
an output electrode connecting sheet, spaced apart from the connector in a transverse direction of the output electrode assembly that is perpendicular to the longitudinal direction, wherein the output electrode connecting sheet serves as a second voltage interface of the battery module; and
a fastening base, having a supporting portion supporting the circuit board, a partition wall located between the output electrode connecting sheet and the connector, the partition wall extending in the longitudinal direction of the output electrode assembly and having a thickness direction in the transverse direction of the output electrode assembly that is perpendicular to the longitudinal direction, and a transitional connection wall connecting the partition wall to the supporting portion;
the fastening base further including a first mounting portion formed on and including one side of the partition wall in the thickness direction of the partition wall, wherein the connector is fixedly mounted to the first mounting portion; and
the fastening base further including a second mounting portion formed on and including the other side of the partition wall in the thickness direction of the partition wall, wherein the output electrode connecting sheet is fixedly mounted to the second mounting portion.

9. The battery module according to claim 8, wherein
the first mounting portion has a first bottom wall connected to the partition wall and extending in the transverse direction; a first front wall connected to the partition wall and the first bottom wall; and a first rear wall spaced apart from the first front wall in the longitudinal direction and connected to the partition wall and the first bottom wall; and
the connector is accommodated in a housing cavity formed by the first bottom wall, the first front wall, the first rear wall and the partition wall.

10. The battery module according to claim 9, wherein the first mounting portion further has an opening formed in the first front wall and/or the first rear wall; and an elastic clasp cantilevered in the opening and griping the connector together with the first rear wall and/or the first front wall.

11. The battery module according to claim 8, wherein
the circuit board is provided with position locking holes; and
the fastening base further has position locking posts disposed on the supporting portion, wherein the position locking posts are fitted with the position locking holes to fasten the circuit board.

12. The battery module according to claim 8, wherein
the second mounting portion has a second bottom wall connected to the partition wall and extending in the transverse direction; a side wall connected to the second bottom wall and spaced apart from the partition wall in the transverse direction; and a second rear wall connected to the second bottom wall and spaced apart from the partition wall in the transverse direction; and
the output electrode connecting sheet is partly located between the second rear wall and the partition wall, and partly accommodated in the housing cavity formed by the second bottom wall, the side wall, the second rear wall and the partition wall.

13. The battery module according to claim 12, wherein the output electrode assembly further comprises an insert embedded in the second bottom wall, wherein the output electrode connecting sheet is fixed to the insert.

14. The battery module according to claim 12, wherein the second mounting portion further has a second front wall connected to the partition wall and the second bottom wall.

* * * * *